United States Patent
Hoshino et al.

(10) Patent No.: US 8,469,203 B2
(45) Date of Patent: Jun. 25, 2013

(54) CABLE CONNECTION INTERFACE FOR RACK MOUNT APPARATUS, AND RACK MOUNT APPARATUS

(75) Inventors: Yoshinori Hoshino, Kawasaki (JP); Tomoyuki Hongoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 884 days.

(21) Appl. No.: 11/808,324

(22) Filed: Jun. 8, 2007

(65) Prior Publication Data

US 2007/0242420 A1  Oct. 18, 2007

Related U.S. Application Data

(63) Continuation of application No. PCT/JP2004/018299, filed on Dec. 8, 2004.

(51) Int. Cl.
*A47F 7/00* (2006.01)
(52) U.S. Cl.
USPC .......................................................... 211/26
(58) Field of Classification Search
USPC ............. 211/26, 41.17, 190, 169, 13.1, 26.2; 361/727, 829; 312/257.1
See application file for complete search history.

(56) References Cited

U.S. PATENT DOCUMENTS

| | | | |
|---|---|---|---|
| 3,228,532 A * | 1/1966 | Sisk et al. | 211/26 |
| 3,420,381 A * | 1/1969 | Bradfield | 211/26 |
| 5,765,698 A * | 6/1998 | Bullivant | 211/26 |
| 5,788,087 A * | 8/1998 | Orlando | 211/26 |
| 6,170,784 B1 * | 1/2001 | MacDonald et al. | 248/65 |
| 6,220,456 B1 * | 4/2001 | Jensen et al. | 211/26 |
| 6,357,603 B1 * | 3/2002 | Dingman | 211/41.17 |

(Continued)

FOREIGN PATENT DOCUMENTS

| | | |
|---|---|---|
| JP | 6-86385 | 12/1984 |
| JP | 63-62300 | 3/1988 |

(Continued)

OTHER PUBLICATIONS

Japanese Patent Office Notice of Reasons for Rejection mailed Dec. 22, 2009 for corresponding Japanese Patent Application No. 2006-546585.

*Primary Examiner* — Darnell Jayne
*Assistant Examiner* — Patrick Hawn
(74) *Attorney, Agent, or Firm* — Staas & Halsey LLP

(57) ABSTRACT

A rack mount apparatus is provided in an optical transmission apparatus. The rack mount apparatus includes a rack, a shelf mounted in the rack and a cross-sectional L-shaped Panel installed in the rack under a device to be rotatable so as to take an opened position and a closed position. This enables not only an easy and reliable connection of an interface cable in the rack mount apparatus without imposing a stress thereon but also a flexible determination or change of a connection position of the interface cable and even considerable improvement of the working efficiency.

14 Claims, 14 Drawing Sheets

U.S. PATENT DOCUMENTS

| | | | |
|---|---|---|---|
| 6,362,422 B1* | 3/2002 | Vavrik et al. | 174/50 |
| 6,443,315 B1* | 9/2002 | Tabuchi | 211/41.17 |
| 6,719,149 B2* | 4/2004 | Tomino | 211/26 |
| 6,766,093 B2* | 7/2004 | McGrath et al. | 385/134 |
| 6,814,244 B1* | 11/2004 | Hathcock | 211/26 |
| 6,884,942 B2* | 4/2005 | McGrath et al. | 174/68.1 |
| 7,184,271 B2* | 2/2007 | Watanabe | 361/727 |
| 7,526,171 B2* | 4/2009 | Caveney et al. | 385/135 |
| 2003/0042215 A1* | 3/2003 | Tomino | 211/26 |
| 2005/0067358 A1* | 3/2005 | Lee et al. | 211/26 |
| 2005/0087504 A1* | 4/2005 | Wu | 211/26 |
| 2005/0247650 A1* | 11/2005 | Vogel et al. | 211/26 |
| 2005/0274680 A1* | 12/2005 | Allen et al. | 211/26 |
| 2006/0118497 A1* | 6/2006 | Knudsen et al. | 211/26 |
| 2006/0180556 A1* | 8/2006 | Shih et al. | 211/26 |

FOREIGN PATENT DOCUMENTS

| | | |
|---|---|---|
| JP | 63-221694 | 9/1988 |
| JP | 5-50781 | 7/1993 |
| JP | 10-215083 | 8/1998 |
| JP | 2003-115680 | 4/2003 |
| JP | 2003-121658 A | 4/2003 |
| JP | 2004-037596 A | 2/2004 |
| JP | 2004-219844 A | 8/2004 |
| JP | 2004-361893 A | 12/2004 |

\* cited by examiner

CABLE CONNECTION INTERFACE FOR RACK MOUNT APPARATUS, AND RACK MOUNT APPARATUS

CROSS REFERENCE TO RELATED APPLICATION(S)

This application is a continuation of PCT International Application No. PCT/JP2004/018299 filed on Dec. 8, 2004, in Japan, the contents of which are hereby incorporated by reference.

BACKGROUND OF THE INVENTION (1) Field of the Invention

The present invention relates to a cable connection interface for a rack mount type apparatus (rack mount apparatus) for use in, for example, an optical transmission apparatus, communication apparatus, information processing apparatus, measurement device or the like, and to a rack mount apparatus having this cable connection interface.

(2) Description of Related Art

In general, an optical transmission station (optical transmission terminal station, optical repeater station, optical reception terminal station) in an optical transmission network conducts the processing such as amplification, repeating, termination, add-drop or the like with respect to an optical signal. Moreover, a large number of optical cables (optical fibers) are brought into each optical transmission station which in turn, carries out the processing such as amplification, repeating, or the like with respect to an optical signal received through an optical cable, with a portion of the processed optical signal being again inputted to an optical cable while the remaining optical signal being, for example, packet-transmitted as an electric signal. The aforesaid amplification, repeating and others are conducted in a shelf. This shelf has, for example, a line accommodation or line termination function to carry out the interface processing such as branch, separation, termination, transfer, format conversion or the like with respect to the received optical signal.

In addition, a plurality of shelves are mounted as one unit on one rack (frame, equipment frame), and there is a requirement for an increase in mounting density of these shelves. In this case, the mounting density signifies the number of shelves one rack can accommodate, and it is equally referred to as packaging efficiency or accommodation efficiency.

Still additionally, the entire equipment in which a desired device works (or operates) in a state accommodated in a rack is referred to as a rack mount apparatus and, in particular, when the rack mount apparatus is equipped with a shelf(s), it is referred to as a rack mount shelf.

FIG. 12($a$) is a perspective view of a common rack mount shelf (rack mount apparatus) viewed from its front surface side, and FIG. 12($b$) is a perspective view of the same rack mount shelf viewed from its rear surface side. The rack mount shelf 100 shown in FIG. 12($a$) is connected through a plurality of optical cables (interface cables) or electric signal cables to the other optical transmission station or the other shelf (not shown) in the same optical transmission station. Strip-like $m_1$ ($m_1$ represents a natural number) slots (insertion openings) 90 are formed in a front surface side of the shelf 100 so that each of the slots 90 allows the insertion of a substrate unit (plug-in unit, printed board unit or package) 91 having a plug-in function.

In addition, for example, as shown in FIG. 12($b$), a connector section (interface connector unit) 120 including a plurality of connectors for the connection with a feeder (power supply) or the other shelf (not shown) is provided on a rear surface of the shelf 100.

Although the size of a rack is determined according to the industry standard, there is no determination in the size of the shelf 100 and, hence, the size of the shelf 100 is designed so as to match the size of the rack and is required to achieve the high-density mounting in one rack. For this reason, so far, there have been employed a method of reducing the size of the shelf 100 and a method of using Back-To-Back mounting which will be mentioned later.

First, although there is a design method of reducing the thickness (vertical width or height) of the shelf 100 for the size reduction, since an extra cable disposition panel for rolling an extra cable (unnecessary or redundant cable of an optical cable) thereon is attached onto a front surface of each shelf 100, limitation is imposed on the reduction of the thickness of the shelf 100. This is because, due to the high-density mounting, the extra cable disposition panel covers the front surfaces of the shelves 100 accommodated at upper and lower positions adjacent to each other. Concretely, if the front surfaces thereof are covered thereby, while each of the shelves 100 are in service, the worker cannot insert or extract a substrate unit 91 into or from each of the shelves 100 adjacent vertically to each other, so difficulty is experienced in conducting the operations such as restoration processing at the occurrence of a trouble, maintenance and replacement.

In the following description, an interface cable will sometimes be referred to as an optical cable or extra cable.

Moreover, the bend radius of the optical cable is required to be set at a value higher than the allowable bend radius so as to prevent the degradation of the total reflection of light in the interior of the optical cable and, further, in view of this restriction on the bend radius, there is a limit to the reduction of the thickness of the shelf 100.

Still moreover, the shelf 100 can internally include a fan unit 110 with a cooling fan, for example, under the slots 90 as shown in FIG. 12($a$) for the purpose of heat radiation processing. When this fan unit 110 is set in the interior of the shelf 100, the vertical size of the shelf 100 increases, which leads to a decrease in mounting density of the shelf 100. Yet moreover, when the fan unit 110 is attached onto a side surface of the shelf 100, the horizontal width of the shelf 100 increases, which makes it difficult to achieve the size reduction of the shelf 100.

Accordingly, the size of the shelf 100 is determined on the basis of various factors including the dimension of the extra cable disposition panel, the bend radius of the optical cable, the dimension of the fan unit 110 and the mounting positions of the units. Moreover, the improvement of the respective factors by the designer enhances the mounting density of the shelf 100.

Thus, in the case of a construction of an optical transmission network, a competition point among the respective companies is "how to mount more shelves" on one rack, such as the number of shelves 100 and the locations thereof.

Secondly, a description will be given of a Back-To-Back mounting method which enhances the mounting density.

FIG. 13 is a partial perspective view showing a rack mount apparatus in the case of the Back-To-Back mounting, and each of two shelves 100 shown in FIG. 13 is mounted in the interior of a rack from a front-to-back direction. Moreover, the respective shelves 100 are fixedly secured to two columns 93 constituting the rack so that they makes a Back-To-Back state. Accordingly, the employment of this mounting method can enhance the mounting density and, hence, this Back-To-Back mounting method is extremely effective.

In general, in an optical transmission station, a large number of racks are placed on a floor in a state closed up in order to save the rack location space. Therefore, the installation of racks Back-To-Back-mounted makes it difficult to sufficiently secure the working space, which makes it extremely difficult to the worker to conduct the operations such as connection change of the connector section 120 provided on a rear surface of each of the shelves 100 or which makes it impossible to conduct the operations. Moreover, a difficult operation can impose a stress on an interface cable 150, which leads to damaging the interface cable 150. Accordingly, when the shelf 100 is in service, difficulty is encountered in carrying out various operations such as the insertion/extraction of the substrate unit 91 (FIG. 12(a)) according to an increase/decrease in the number of subscribers, connection change of the interface cable 150 involved in the insertion/extraction of the substrate unit 91 and maintenance/inspection of the shelves 100. In other words, since the two shelves 100 and the rack are fixed (fastened), difficulty is experienced in carrying out the change of the connection of the interface cable 150 without restriction.

For this reason, in order to avoid the damages of the interface cable 150 and to enable the change or setting of the connection state of the interface cable 150, a front access panel 140 into which a plurality of connectors (connection portions) 9 are inserted is provided at a bottom portion of each of the two shelves 100. Each of the connectors 9 is directly connected to each of one ends of the interface cable 150, and each of the other ends of the interface cable 150 is connected to a connector portion (not shown) on a rear surface of each of the shelves 100. Thus, the worker can accomplish the connection setting and connection change of the interface cable 150 from the front surface side of the shelf 100.

On the other hand, the method of additionally mounting the front access panel 140 in the shelf 100 also has a limitation on the mounting density. For example, in a case in which the front access panel 140 is placed at a lower portion of the shelf 100 (or an upper portion of the shelf 100, not shown) as shown in FIG. 13, the combination of the shelf 100 and the front access panel 140 causes an increase in vertical width H, which can suffer the degradation of the mounting density of the shelves 100. Meanwhile, although an access box having the same function as that of the front access panel 140 can also be set on a side surface of the shelf 100, as mentioned below with reference with FIG. 14, in the case of a small rack width, difficulty is encountered in setting the access box on a side surface of the shelf 100.

FIG. 14 is an illustration of one example of a shelf equipped with an access box, and a shelf 100a shown in FIG. 14 has an access box 140a into which a connector section 120 including a plurality of connectors are fitted and which is attached to a side surface thereof.

In most cases of rack width (portion denoted by L) taken by various manufactures (which will be referred to hereinafter as mainstream), it is a width of 23 inches (1 inch=approximately 2.54 cm). Accordingly, as a conventional rack, it is possible to employ an integrated type of the access box 140a and the shelf 100a as shown in FIG. 14.

On the other hand, recently, there has been a requirement for a small-sized rack. In particular, the employment of a shelf increases as an IP (Internet Protocol) packet transferring apparatus, and the mainstream of the rack width reaches a 19-inch width. For this reason, difficulty is encountered in securing an area (or space) for attaching the access box 140a onto a side surface of the shelf 100a. Moreover, a rack combining an IP packet transferring function and an optical transmission function is in increasing demand.

Accordingly, since the shelves 100 (100a) are mounted vertically in a line along a vertical direction of the rack, there exists a requirement for a flexible shelf mounting method having a large degree of freedom allowing the free selection of a size mounting method. This flexible mounting method requires, for example, a structure capable of separating the access box 140a and the shelf 100a so that a connection can easily made through a high-reliability interface cable 150 between the access box 140a and the shelf 100a. Therefore, a structure having less degree of freedom of the rack mounting, for example, an integrated structure between the access box 140a and the shelf 100a, is unsuitable in the case of a construction of an optical transmission system requiring abundant variations on the locations of the shelves 100a and the rack.

As mentioned above, according to the conventional techniques, with respect to the size reduction of the shelves 100, there is a limit to the reduction of the thickness of the shelf 100 and, hence, there is still a requirement for the high-density mounting of the shelves 100. Moreover, also in the case of the employment of a method of placing the front access panel 140 on an upper or lower surface of the shelf 100 or a method of attaching the access box 140a onto a side surface of the shelf 100a, which is for accomplishing the Back-To-Back mounting, difficulty is experienced in overcoming the limitations. Still moreover, there is no freedom of the change of the rack mounting method.

A large number of rack mount apparatuses have been proposed so far (for example, see Patent Documents 1 and 2)

The communication apparatus disclosed in the Patent Document 1 is such that a common shelf is provided and a rear access kit or front access kit is selectively mounted on the common shelf according to a station space. The front access kit has a plurality of connectors provided in the vicinity of a front surface thereof, and cables extending from outside line connectors are connected to the connectors from the rear side. The connectors are of a type in which a large number of pins are protrusively formed on the front side of the apparatus, and they are connected to different connector cables on the front side of the apparatus.

The front access terminal board of a communication apparatus disclosed in the Patent Document 2 is such that an extra portion is added to a cable within the apparatus so as to enable a connector assembly to slide in a front-to-back direction in a terminal section within an extra range.

The communication apparatuses disclosed in these Patent Documents 1 and 2 cannot achieve both the above-mentioned high-density mounting of shelves 100 and free change of the rack mounting method.

However, as described above, in the case of the employment of the conventional techniques, it is difficult to improve the mounting density of the shelves 100. Moreover, in the case of the employment of the Back-To-Back mounting method, there is a problem in that the operation for the connection of the connector section 120 becomes impossible.

In addition, in a case in which the front access panel 140 or the like is placed on an upper/lower surface or side surface of the shelf 100, there is a problem in that difficulty is experienced in securing the sufficient installation space and appropriate installation position for the front access panel 140 or the like and a large burden falls on the optical cable connection operation and others.

Nowhere in the above-mentioned Patent Documents 1 and 2 is there any disclosure of a technique for improving the mounting density and the free change of mounting position.

The present invention has been developed in consideration of these problems, and it is an object of the invention to provide a structured interface cable connection panel in a rack mount apparatus and a rack mount apparatus, capable of, in a rack mount apparatus, achieving an appropriate connection of an interface cable between a desired device such as a shelf and a panel such as a front access panel, changing an installation position of the front access panel and further shortening the work time taken for the connection between the panel and the interface cable.

[Patent Document 1] Japanese Patent Laid-Open No. SHO 63-221694

[Patent Document 2] Japanese Patent Laid-Open No. SHO 63-62300

SUMMARY OF THE INVENTION

For this purpose, in accordance with the present invention, a cable connection interface for a rack mount apparatus, which mounts a desired device on a rack, comprising a cross-sectional L-shaped panel installed on the rack to be rotatable so as to take at least an opened position and a closed position, with a connection portion with an interface cable to be connected to the device being provided on a surface portion exposed at the opened position of the panel.

Thus, a connection of the interface cable between the apparatus and the cross-sectional L-shaped panel can easily and reliably made without imposing a stress on the interface cable. Moreover, processing units for signals different in type from each other can be mounted in a rack with a small width in a state mixed.

In addition, a rack mount apparatus according to the present invention comprises a rack, a desired device mounted in the rack and a cross-sectional L-shaped panel installed in the rack under the device to be rotatable so as to take at least an opened position and a closed position.

Thus, the installation position of the cross-sectional L-shaped panel can flexibly be selected or changed, thereby reducing the work burden, securing a sufficient space for, for example, operations and further shortening the work time to be taken for the connection work of an interface cable and others.

This cross-sectional L-shaped panel can be constructed as mentioned in the following (i) and (ii).

(i) A slide mechanism is provided so as to allow the device to slide to take at least a withdrawn position and an accommodated position, and the panel takes an opened position at the withdrawn position of the device, and the aforesaid panel is rotated from the opened position to the closed position in accordance with a sliding operation of the device to the accommodated position of the device by the slide mechanism.

(ii) A withdrawn member which can take a withdrawn position and an accommodated position with respect to the rack is provided between the device and the panel, and the panel takes the opened position at the withdrawn position of the withdrawn member, and the panel is rotated from the opened position to the closed position in accordance with a pushing operation of the withdrawn member toward the accommodated position.

Therefore, when a structure is made as mentioned in (i) and (ii), the rack mount apparatus enables the high-density mounting of devices and allows devices different in function from each other to be mounted in a mixed state, which permits the rack mount apparatus to have various functions.

Furthermore, the cross-sectional L-shaped panel can be constructed as mentioned in the following (iii) and (iv) according to (i) and (ii).

(iii) When an end portion of the panel is brought into contact with the device by the sliding operation of the device, the panel is rotated from the opened position to the closed position.

With this construction, while the device is in operation, the worker can reliably monitor the connection state of a specified connector and the work space for the worker is securable.

(iv) When an end portion of the panel is brought into contact with the withdrawn member by the pushing operation of the withdrawn member, the panel is rotated from the opened position to the closed position.

This construction enables the high-density mounting of devices having a larger vertical width and the packaging function. Moreover, even in a case in which different devices having various types of functions are mounted in a mixed state, it is possible to make a connection of an interface cable, make a free selection of a device mounting method and flexibly determine/change the installation position of the cross-sectional L-shaped panel.

In addition, it is also appropriate that the panel has a rotary shaft whose both ends are rotatably supported by the rack and two surface portions intersecting each other on the axis of the rotary shaft and one surface portion of the two surface portions intersecting each other is brought into contact with the device or the withdrawn member while a connection portion with the interface cable to be connected to the device is placed on the other surface portion of the two surface portions. This contributes to the improvement of the beauty of the device. Moreover, because of the considerable improvement of the visibility for the worker, it is possible to shorten the work time taken for the installation operation and the connection operation.

Still additionally, it is also appropriate that an extra portion processing unit for processing an extra portion of the interface cable is provided in the panel, or that a cable holding section for fractionating a plurality of interface cables is provided on the panel. This permits the employment of the existing techniques such as the extra cable processing and the improvement of the transmission characteristic. Moreover, this can eliminate the need for the delicate length adjustment operation of the interface cable, for example, an optical cable, thus avoiding a connection of an optical cable which brings about a degradation of the transmission characteristic.

DESCRIPTION OF THE PREFERRED
EMBODIMENT(S)

(A) Description of First Embodiment of the Present Invention

A structured interface cable connection panel (cable connection interface) (which will hereinafter be referred to simply as a structured panel, unless otherwise specified particularly) in a rack mount apparatus (rack mount type apparatus) to which the present invention is applied is for use in, for example, a communication apparatus (optical transmission apparatus, packet transferring apparatus, line accommodation apparatus, or the like), information processing apparatus, measurement device, and others.

In a description of a first embodiment, in an optical transmission station, an apparatus in which a plurality of shelves are accommodated in one rack (frame, equipment frame) will be referred to as a rack mount apparatus and an optical cable connected to each of the shelves will be referred to as an interface cable. Moreover, an optical cable will sometimes be referred to as an interface cable or extra cable.

Unlike a cable for electric signals, this optical cable should be hard-wired so that a bend radius larger than an allowable bend radius is maintainable throughout the overall length of the optical cable, and the following description will be given on the assumption that devices, members, structures and others were installed and formed in consideration of the restrictions on the bend radius of the optical cable.

Figure 1:
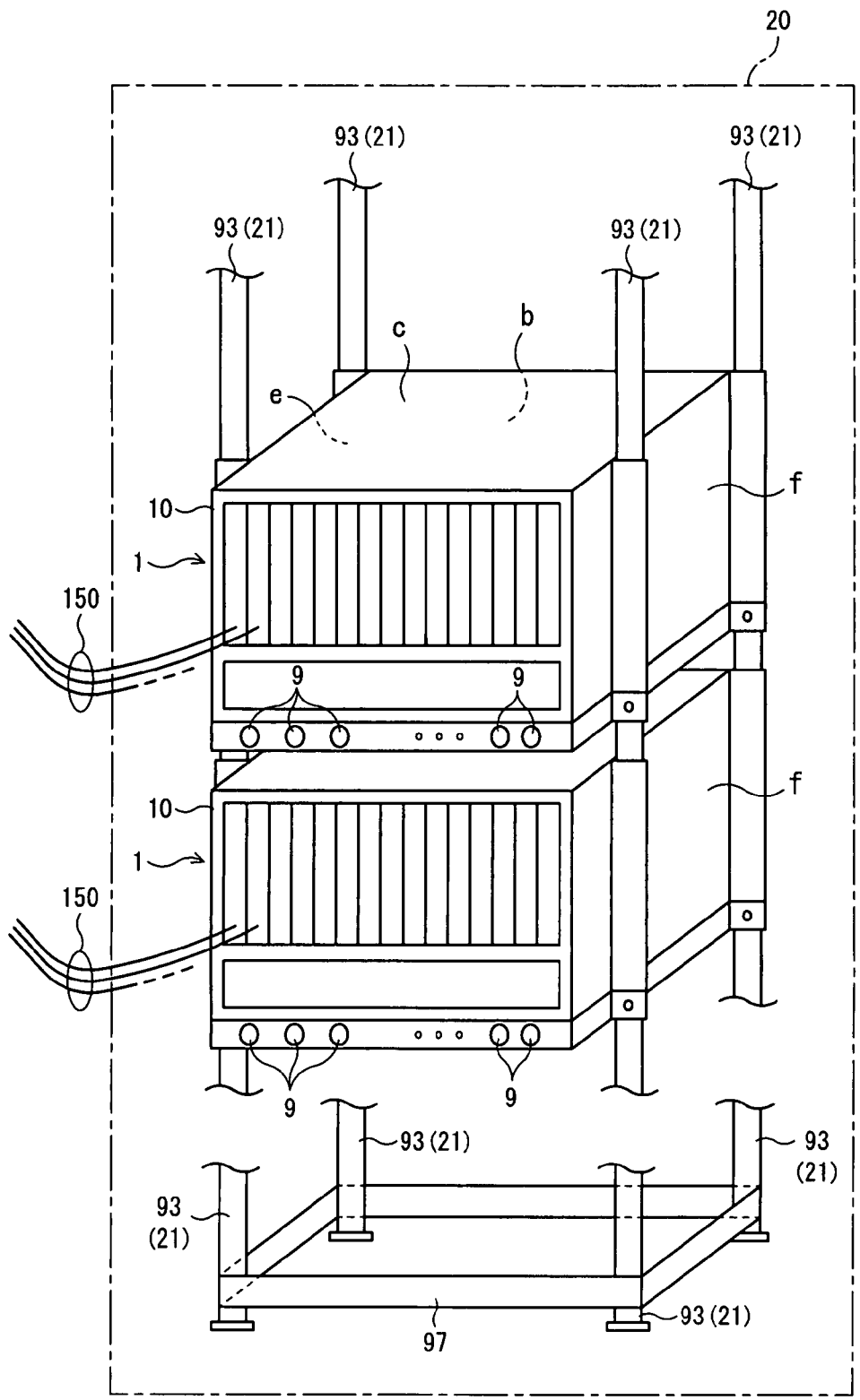
FIG. 1 is a front perspective view illustratively showing a rack mount apparatus according to a first embodiment of the present invention.

FIG. 1 is a front perspective view illustratively showing a rack mount apparatus according to the first embodiment of the present invention. The rack mount apparatus 20 shown in FIG. 1 is for mounting n (n represents a natural number. In this example, n=2) shelves (desired device) 1 in a rack 21.

In this structure, the rack 21 is made as frame members (fixing members, supporting members) for mounting the n shelves 1 and is composed of, for example, 4 columns 93 placed in parallel with both side surfaces e and f of the shelves 1 and reinforcement members 97 placed upper end sides and lower end sides of the respective columns 93 for making connections between the two columns 93 adjacent to each other. Incidentally, in place of the reinforcement members 97 or in addition to the reinforcement members 97, as needed, flat plates such as top boards and floor boards, or the like, are attached to the respective columns 93. Moreover, it is also acceptable to employ columns whose cross-sections have, for example, U-like, H-like configurations or the like.

Each of the shelves 1 is connected to many interface cables 150 and is made to carry out the interface processing such as branch, separation, termination, transfer, format conversion and others with respect to an optical signal and further to conduct the interface processing with respect to an electric signal (for example, packet signal, subscriber line signal or the like). Moreover, each of the shelves 1 is attached to the 4 columns 93 constituting the rack 21 and the shelves 1 vertically adjacent to each other are disposed vertically in a line in a state spaced by a predetermined interval.

That is, the entire apparatus which works (or operates) in a state where the n shelves 1 are mounted in the rack 21 constitutes the rack mount apparatus 20.

In addition, as will be mentioned later, each of the shelves 1 has a slider for the device sliding, and a slide guide or slide rail is placed on the rack 21 side so as to allow the slider of each of the shelves 1 to slide on the guide of the rack 21 so that the shelf 1 is movable front-to-back directions with respect to the rack 21. That is, the sliding function is fulfilled in cooperation between the slider and the guide, which enables the shelves 1 to be pushed into the rack 21 and to be withdrawn therefrom. The rack mount apparatus 20 shown in FIG. 1 is in a state where the shelves 1 are pushed into the rack 21 and, in this state, a plurality of connectors (connection portions) 9 each connected to each of a plurality of interface cables 150 appear on a front surface a of each of the shelves 1. Therefore, a worker can conduct connection work while accurately recognizing the positions of the respective connectors 9, which prevents mistaken connections of the interface cables 150 and the connectors 9. On the other hand, an appearance in a state where the shelf 1 is extracted from the rack 21 is shown in FIG. 2.

Figure 2:
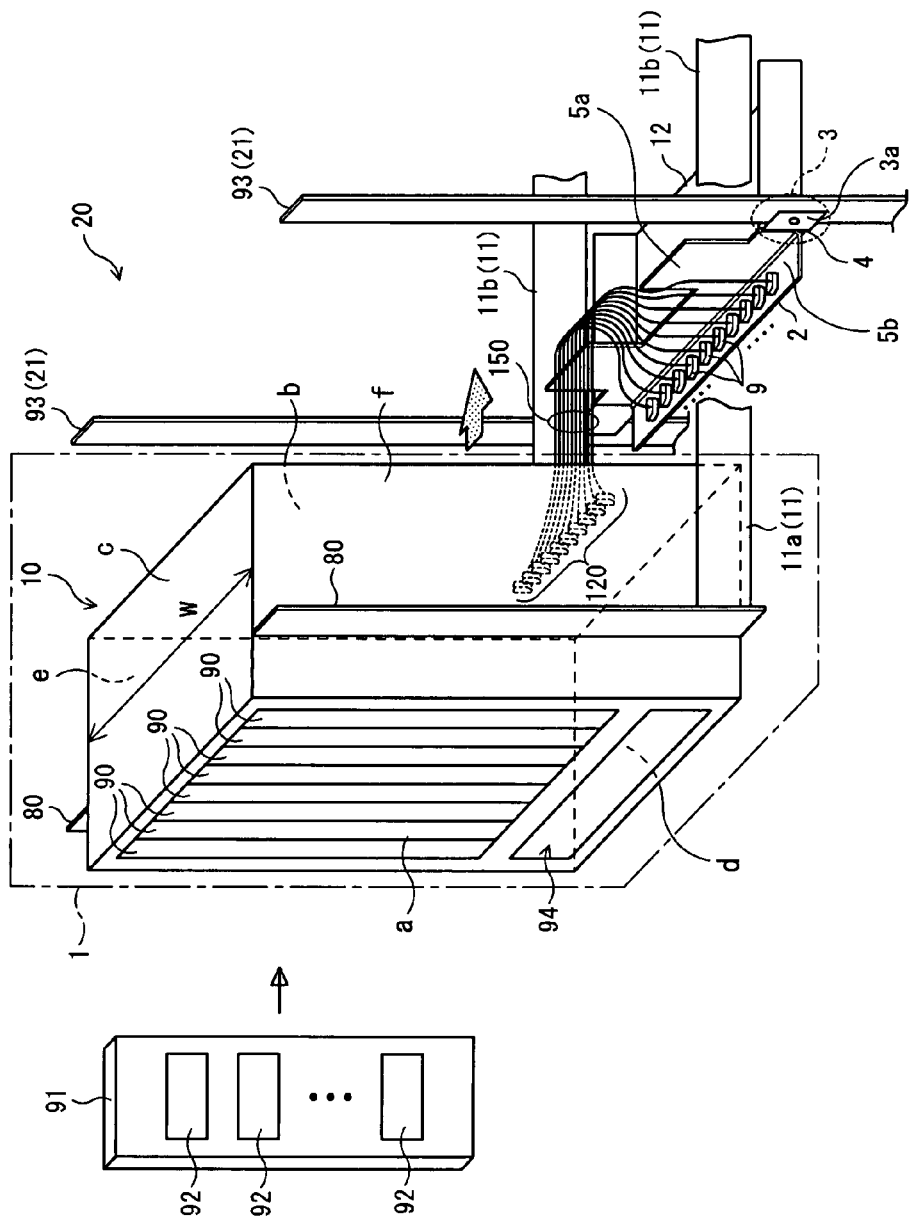
FIG. 2 is a front perspective view illustratively showing a rack mount apparatus, in which a shelf is in a withdrawn state, according to the first embodiment of the present invention.

FIG. 2 is a front perspective view illustratively showing the rack mount apparatus 20 in a state where the shelf 1 is withdrawn therefrom. As shown in FIG. 2, the rack mount apparatus 20 is additionally equipped with a front access panel (cross-sectional L-shaped panel) 2 which is rotatably mounted on the rack 21 under the shelf 1 mounted in the rack 21 so as to hold an opened position and a closed position. In this case, as shown in FIG. 2, the opened position of the front access panel 2 signifies a state in which the plurality of connectors 9 take a horizontal direction while, as shown in FIG. 4(b), the closed position of the front access panel 2 depicts a state the front access panel 2 appears on a side of the front surface a of the shelf 1. Incidentally, it is also possible that, in addition to the opened position and the closed position, the front access panel 2 holds multi-step positions.

Each of the shelves 1 is made up of a shelf main body 10, a pair of attachment members 80 and a slide mechanism 11. The shelf main body 10 has a hollow interior and a box-like configuration in appearance, and a plurality of partition boards are inserted into this hollow section so as to form $m_2$ ($m_2$ denotes a natural number, for example, $m_2$ is 8) slots 90 and an opening portion 94. Moreover, substrate units 91 up to $m_2$ in number are inserted into the $m_2$ slots 90 and a cooling unit or cooling member is inserted into the opening portion 94, so the shelf main body 10 functions as a frame for the substrate units 91 and others. Still moreover, the width (shelf width) W of the shelf main body 10 is 19 inches (1 inch=approximately 2.54 cm) equal to, for example, the shelf width of a packet transferring apparatus (not shown) such as an IP packet, and an optical signal shelf 1 and a packet transfer shelf can be mounted in one rack 21 in a mixed state.

In FIG. 2, a portion of the slide mechanism 11 is broken and placed into a non-shown state for the purpose of showing the front access panel 2.

In addition to the front surface (open face) a, the shelf main body 10 has surfaces (surface portions) b, c, d, e and f. The front surface a serves as a work surface for the insertion and extraction of the substrate units 91, and the surface b is a rear surface for concentrating power feed cables and N (N represents a natural number) interface cables 150 making connections with the other optical transmission stations or connections with the other shelf adjacent thereto as shown in FIG. 1. Moreover, the top surfaces c and d are a ceiling surface and a bottom surface, respectively, and the surfaces e and f are a left-side surface and a right-side surface, respectively, when viewed from the surface a. Also in the following description, the names of these faces will be used in the same meanings.

Furthermore, each of the $m_2$ slots 90 is a space for the insertion of the substrate unit 91 in which a plurality of line termination circuits 92. The respective slots 90 are formed by inserting $m_2$-1 partition boards having the same height as that of the slots 90 into grooves made in an opposite side of the top surface c of the shelf main body 10.

The opening portion 94 is a space which can internally accommodate a unit, such as a cooling unit, having a function different from that of the interface processing unit. This opening portion 94 is not provided on both the side surfaces e and f of the shelf main body 10 but it is made under the respective slots 90, there by making the shelf width W slimmer.

In this connection, it is possible to make various changes on the shape, size, position and others of each of the slots 90 and the opening portion 94 in design. For example, it is also acceptable that a partition board is provided at a height corresponding to approximately the half of the height of the slot 90 so as to divide one slot into two, or that the opening portion 94 is divided vertically or horizontally into a plurality of spaces. Moreover, add to it that, for example, the respective slots 90 are formed in parallel with a horizontal direction.

In addition, the two attachment members 80 are, for example, thin flat plates which are attached through screws or bolts to the two columns 93. In the respective attachment members 80, one edge portions of flat plates vertically fitted thereto are fixedly secured to both the side surfaces e and f of the shelf main body 10 (integrated with both the side surfaces e and f). In this case, in each of the attachment members 80, holes for the screwing or bolting are made at a predetermined interval and fixedly secured to holes (or openings) of the columns 93 through the use of screws or bolts.

Still additionally, the shelf 1 side connector section (interface connector unit of the shelf 1) 120 has N (or more than N) connectors 9 made on the rear surface b and is for concentrating the interface cables (or electric cables) 150 connected to the substrate unit 91 in the interior of the shelf main body 10 and the power feed cables. One end sides of the concentrated interface cables 150 are connected to the front access panel 2.

Yet additionally, the slide mechanism 11 is designed to slide the shelf 1 so that the shelf 1 takes a withdrawn position and an accommodated position. This function is exhibited in a manner such that, for example, sliders 11a respectively placed on the left-side surface e and right-side surface f of the shelf 1 and guides 11b fixed to the rack 21 or a bearing plate (panel supporting member fixed to portions of the respective columns 93 which have a desired height) 12 cooperate with each other. In this case, each of the sliders 11a of the shelf 1 is made by using, for example, a plate-like metallic member in which a groove is formed, and each of the guides 11b fixed to the rack 21 or the like is made by using, for example, a hollow member which internally has a hollow portion accommodating the slider 11a in greater or lesser degrees and which has a flat opening portion. In other words, each of the sliders 11a and each of the guides 11b are similar to a "sword" and a "sheath accommodating a sword", respectively.

Furthermore, when the shelf 1 is slid to approach the rack 21, the sliders 11a are accommodated into the guides 11b, and the members constituting the slide mechanism 11 are accommodated simultaneously with the sliding of the shelf 1.

In the slide mechanism 11 shown in FIG. 2, although the shelf 1 is viewed from the front surface side and only the portions on the right-hand surface side are shown, the slide mechanism 11 having the same structure is also provided on the left-hand surface side of the shelf 1. Moreover, contrary to the aforesaid accommodation relation between the sliders 11a and the guides 11b, it is also possible that the sliders 11a and the guides 11b are provided on the rack 21 and the shelf 1, respectively.

In this way, the shelf 1 having the interface processing function is manually slid by a worker through the use of the slide mechanism 11.

Thus, when the slide mechanism 11 is set in a direction of intersecting the two columns 93 on the front surface side of the shelf 1, for example, at an angle of approximately 90° and the shelf 1 is slid on the guides 11b, the shelf 1 can take a withdrawn position (FIG. 2) and an accommodated position (FIG. 1). In this connection, the intersection angle is not always required to be fixed strictly to 90°, but the intersection angle can also be determined in consideration of factors such as a condition allowing smooth rotation of the front access panel 2 and a position providing good visibility for the worker.

This interface processing function is carried out by the respective substrate units 91 placed in the interior of the shelf 1. As one example, each of the substrate units 91 is for carrying out the respective interface processing such as amplification, termination and repeating of a signal, and one or a plurality of line termination circuits 92 are packaged therein. The respective processing signify optical signal processing (physical processing such as optical multiplexing, optical demultiplexing and optical amplification), termination processing (mutual conversion between light and electricity, and others), transfer processing (packet transmission/reception, packet multiplexing, packet demultiplexing, and others), format conversion of each subscriber line signal, and others.

Moreover, each of the respective substrate units 91 has a plug-in function. Concretely, the worker inserts one substrate unit 91 into the opening portion 94 to engage this substrate unit 91 with a board (not shown) in the interior of the shelf main body 10 for energizing this one substrate unit 91. That is, when one substrate unit 91 is inserted into the slot 90, this one substrate unit 91 automatically becomes an operable state, thus enabling the transmission/reception of a signal with respect to the other optical transmission stations and the other shelves 1.

Still moreover, each of the substrate units 91 is detachable with respect to the board, and it is possible to increase/decrease the number of subscribers to be accommodated (processed) by one shelf 1 by adjusting the number of substrate units 91 to be inserted. For example, when the substrate units

91 are inserted into all the $m_2$ slots 90, it is possible to package the substrate units 91 which are up to $m_2$ in number. That is, an increase/decrease in the number of the substrate units 91 becomes feasible to an increase/decrease in the number of subscribers.

Furthermore, a description will be given of a structured panel (structured interface cable connection panel) in this rack mount apparatus 20.

As FIG. 2 shows, this structured panel includes the cross-sectional L-shaped (cross-sectional L-like) front access panel 2 set up through a rotary mechanism 3 between the above-mentioned pair of columns 93 and the aforesaid bearing plate 12.

The two columns 93 describe a dimension of diameter of a fixing bolt, a position of the bolt diameter and others. The size of the rack 21 is standardized by, for example, the industrial standards such as JIS (Japanese Industrial Standards Committee) and EIA (Electronic Industries Alliance), whereas the size of the shelf 1 is not standardized. For this reason, a designer of the shelf 1 makes a design so that the overall length of a plurality of shelves 1 becomes within a range of the size of the rack 21 standardized. Moreover, on a floor of an optical transmission station, the bottom area of the rack 21 is reduced so as to increase the number of racks 21 to be installed, which can promote the increase in the number of subscribers. Also from this point of view, the size reduction of the shelf 1 is necessary.

Figure 3:
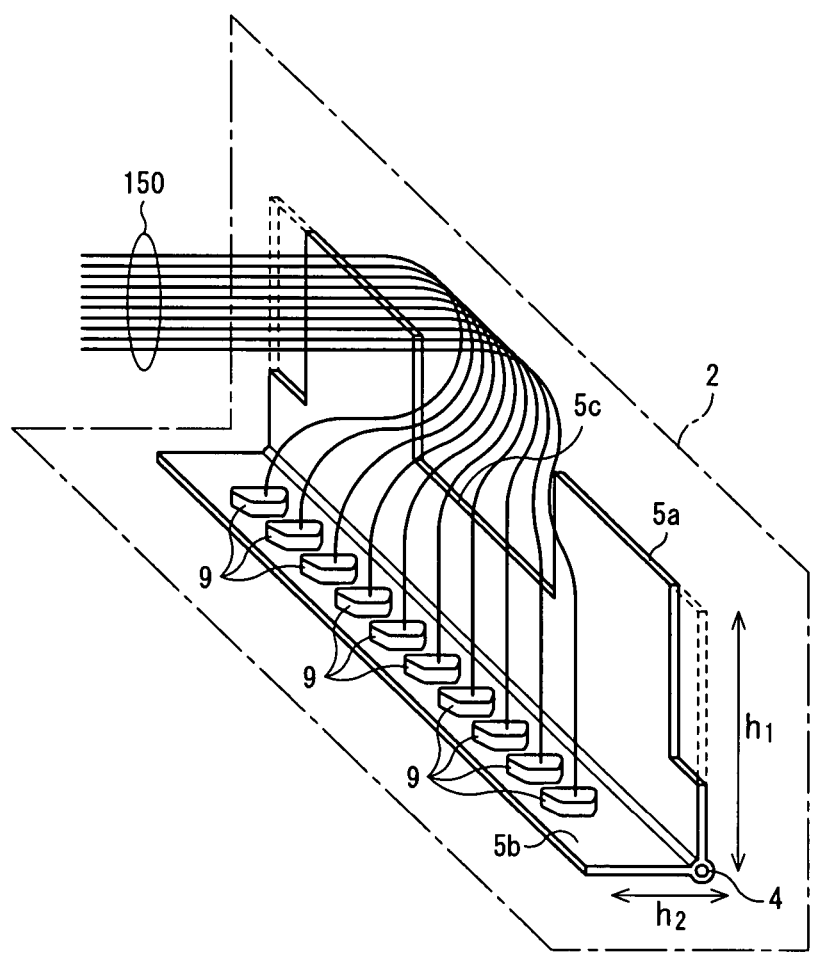
FIG. 3 is a perspective view showing a cross-sectional L-shaped panel to be used in a rack mount apparatus according to the first embodiment of the present invention.

For example, as shown in FIG. 3, the front access panel 2 has an L-shaped configuration in cross section (including a reverse L-like shape made by reversing the L-like shape), and it is composed of a rotary shaft (shaft portion) 4 whose both ends are rotatably supported by the rack 21) and two surfaces of flat surface 5a and a connector surface 5b which intersect each other at approximately right angles on the axis of the rotary shaft 4.

In this structure, the rotary mechanism 3 has a bearing structure for rotatably supporting both the end portions of the rotary shaft 4, and this bearing structure is realized with, for example, holes, grooves or the like formed in fixing members 3a (back-side fixing members 3a shown in FIG. 2 is not shown) fixedly secured to the pair of columns 93. Moreover, the rotary shaft 4 is interposed between one edge portion of the flat surface 5a and one edge portion of the connector surface 5b. Incidentally, the dimension, shape, mounting position of the fixing member 3a are appropriately determined on the basis of the positions, shapes and others of the front access panel 2, the columns 93, bearing plate 12 and others. In addition, in design, appropriate materials, strength and others are selected as the materials, strength and others of the rotary shaft 4 and the fixing members 3a. When a gear-like member is used as the bearing member, the rotary mechanism 3 can fix the rotational position in a multi-step fashion, so the front access panel 2 can hold multi-step rotational positions.

Furthermore, a detailed description will be given of the flat surface 5a and connector surface 5b to be rotated integrally with the rotary shaft 4.

The flat surface 5a is a metal-made flat plate and, when the shelf 1 is pushed toward the rack 21 side, it comes into contact with the shelf 1 and falls down toward the rack 21 side, so the front access panel 2 becomes rotatable. Therefore, an end portion (flat surface 5a) of the front access panel 2 is brought into contact with the shelf 1 by the sliding operation of the shelf 1, and the front access panel 2 is rotated from the opened position to the closed position. Incidentally, when packaged in the rack mount apparatus 20, both side portions (portions indicated by dotted lines) of the flat surface 5a shown in FIG. 3 are removed so as to avoid the contact with the sliders 11a and the guides 11b.

Moreover, in the connector surface 5b, there are fitted N (or more than N) connectors 9 connected to the N interface cables 150, respectively. That is, the connector surface 5b functions as a panel side connector section (interface connector unit of the front access panel 2). Still moreover, of the above-mentioned two surfaces of the flat surface 5a and connector surface 5b intersecting each other, the flat surface 5a comes into contact with the shelf 1, and the connectors 9 for the interface cables 150 to be connected to the shelf 1 are made in the connector surface 5b of the two surfaces of the flat surface 5a and the connector surface 5b.

Therefore, the structured interface cable connection panel of this rack mount apparatus 20 includes, in the rack mount apparatus 20 for mounting the shelves 1 in the rack 21, the front access panel 2 mounted rotatably so as to be capable of holding an opened position and a closed position, and the connectors 9 for the interface cables 150 to be connected to the shelf 1 are provided on the connector surface 5b exposed at the opened position of the front access panel 2.

The height $h_1$ of the flat surface 5a is set to be higher than the height $h_2$ of the connector surface 5b. This is because, if the height $h_2$ of the connector surface 5b is higher than the height $h_1$ of the flat surface 5a, at the rotation of the front access panel 2, the connector surface 5b comes into contact with a lower portion of the shelf main body 10 and hinders the rotation thereof. Moreover, the shape, installation position and others of the front access panel 2 are sometimes be changed in accordance with the position of the floor, on which the rack 21 is located, and the operation contents.

Furthermore, both the ends of the rotary shaft 4 are fixedly secured through the fixing members 3a to the columns 93. In other words, in the front access panel 2, the rotary shaft 4 is placed at a corner portion (bent portion of the panel) between the flat surface 5a and the connector surface 5b and at least N connectors 9 are mounted in one edge side (connector surface 5b) of the L-shaped plate member, while a broken portion 5c is formed in the other edge side (flat surface 5a) of the plate member.

In addition, this broken portion 5c has a function to guide the wiring of the interface cables 150 and, as one example of the broken configuration, the broken portion 5c is positioned at a central portion of the flat surface 5a so that the interface cables 150 pass through this broken portion 5c. This broken portion 5c presents the interface cables 150 from being bent by force. The shape of the broken portion 5c can diversely be changed according to the diameter, number and allowable bend radius of the interface cables 150, the positional relationship between the shelf main body 10 and the front access panel 2, and others.

Likewise, the shapes, positions and others of the respective members shown in FIG. 2 are one example, and the shapes and the positions are changeable in a range which do not constitute departures from the spirit and scope of the invention and are not limited to these shown in FIG. 2.

Moreover, the positions of the sliders 11a and the guides 11b constituting the slide mechanism 11 shown in FIG. 2 an also take multi-step positions in addition to the withdrawn position and the accommodated position. Still moreover, the aforesaid front access panel 2 reaches the opened position at the withdrawn position of the shelf 1, and the front access panel 2 is rotated from the opened position to the closed position in accordance with the sliding operation of the shelf 1 to the accommodated position thereof.

Therefore, while the shelf 1 is in operation, the worker can reliably monitor the connection state of a specified connector 9. Moreover, the slide mechanism 11 can secure the working space for the worker.

In addition, the bearing plate 12 shown in FIG. 2 functions as a stopper to stop the front access panel 2 when it reaches an angle of rotation of approximately 90°. The connector surface 5b which is at the position shown in FIG. 2 takes a horizontal state while the connector surface (surface indicates reference numeral 5b) after the rotation (FIG. 4(b)) is directed to the front of the worker, and the angle of rotation thereof stands at approximately 90°. Accordingly, in FIG. 2, when the access panel is rotated by approximately 90°, the flat surface (surface indicated by reference numeral 5a) comes into contact with the bearing plate 12, thereby stopping the rotation exceeding approximately 90°.

This bearing plate 12 includes a flat plate having a width approximately equal to that shelf width W of the shelf main body 10 and standing wall portions formed at both end portions of this flat plate. The depth length of the flat plate is required to be set at a value longer than the length of the flat surface 5a of the front access panel 2, and it is required to be set at a length needed for stopping the front access panel 2 when rotated. Moreover, the standing wall portions are for fixing the bearing plate 12 to the columns 93 and is formed by using wall portions fixedly secured to both the end portions of the flat plate, or the like. Still moreover, the tip portions of the standing wall portions on the shelf main body 10 side are bent into an L-like configuration (including a reverse L-like configuration), and the bent fixing members 3a are fixed to the columns 93. It is preferable that the heights of the standing wall portions are set so as not to come into contact with the peripheral members such as the slide mechanism 11. Yet moreover, the bearing plate 12 is fixedly secured to the columns 93 at an appropriate height on the basis of the height and position of each of the shelf main body 10 and the front access panel 2.

Secondly, a description will be given of one example of an installation procedure of the front access panel 2

First of all, the worker mounts the front access panel 2 on the two columns 93 and places the sliders 11a of the shelf 1 on the guides 11b and, in this state, connects each of the N interface cables 150 to each of the rear surface b of the shelf 1 and the connector surface 5b. In this connection operation, since each of the connectors 9 is in an upward state, the worker can recognize the position of each of the connectors 9 clearly and carry out the cable connection more accurately.

Figure 4A:
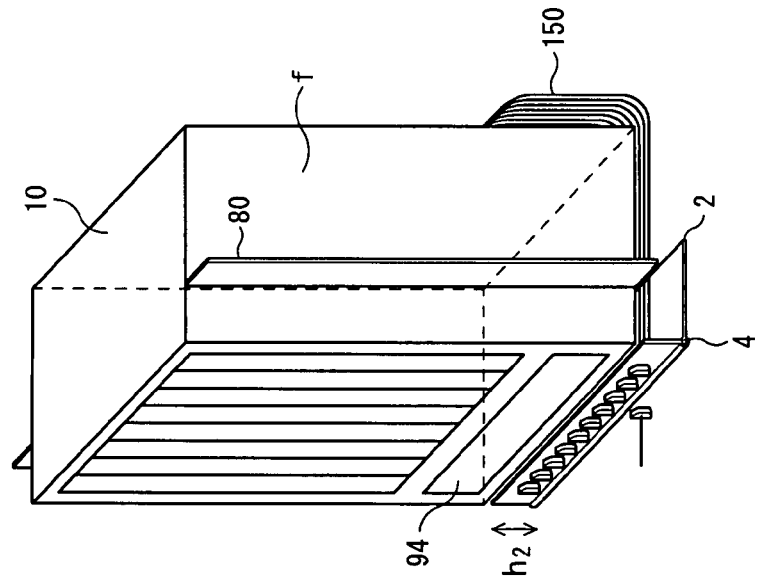
FIG. 4(a) is an illustration of a rotated position at the insertion of a cross-sectional L-shaped panel into a rack in a rack mount apparatus according to the first embodiment of the present invention.
Figure 4B:
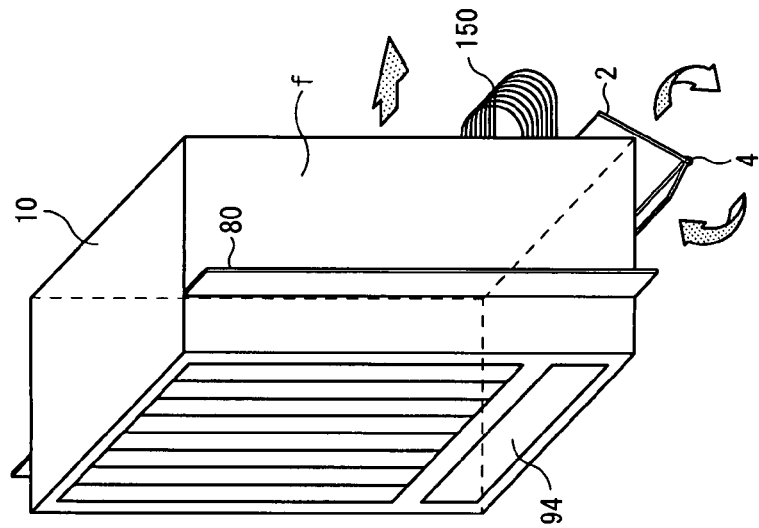
FIG. 4(b) is an illustration of a rotated position at the completion of the mounting of the cross-sectional L-shaped panel on the rack in the rack mount apparatus according to the first embodiment of the present invention.

FIG. 4(a) is an illustration of a rotated position of the front access panel 2 at the insertion into the rack 21 in the rack mount apparatus 20 according to the first embodiment of the present invention, and shows a state in which the shelf 1 is inserted into the rack 21. The flat surface 5a of the front access panel 2 shown in FIG. 4(a) is rotated around the rotary shaft 4 while being pushed thereinto by the shelf 1. Therefore, the broken portion 5c of the flat surface 5a avoids the occurrence of an excessive load on the interface cables 150.

The respective parts shown in FIG. 4(a) and the next FIG. 4(b) and marked with the same reference numerals as those used above are the same parts as those mentioned above.

When the cable connection reaches completion, the worker pushes the shelf 1 toward the rack 21 side (in a direction indicated by an arrow), and the mounting operation in the rack 21 reaches completion.

FIG. 4(b) is an illustration of a rotated position of the front access panel 2 at the completion of mounting in the rack 21 in the rack mount apparatus 20 according to the first embodiment of the present invention. When this front access panel 2 shown in FIG. 4(b) is viewed from the right-hand surface f side, the angle of rotation of the front access panel 2 becomes an angle made by rotating it by approximately 90° with respect to the angle of rotation before the insertion of the shelf 1. Moreover, the connector surface 5b appears on the front surface a side of the shelf 1 (on a side opposite to the connector section 120), and it constitutes a portion of the front surface a of the front access panel 2. At this position, the worker connects the interface cables 150 and the power feed cables from the front surface a side.

Figure 5A:
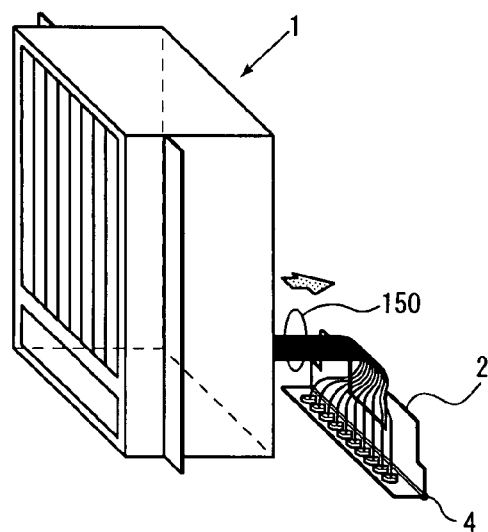
FIGS. 5(a) to 5(c) are illustrations for explaining the rotation of a front access panel according to the first embodiment of the present invention.
Figure 5B:
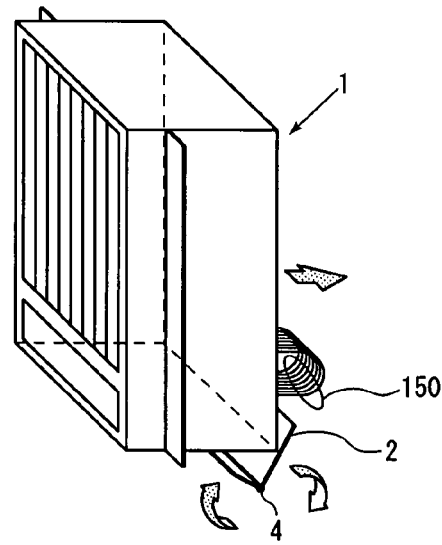
Figure 5C:
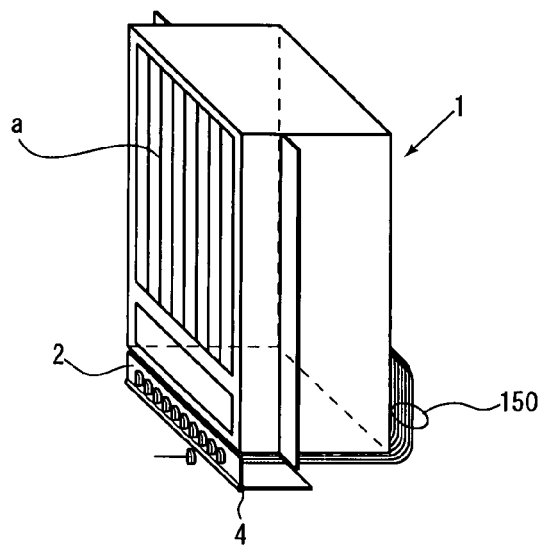

The rotations of the front access panel 2 shown in each of FIGS. 4(a) and 4(b) are shown in FIGS. 5(a) to 5(c) with reference to the rotary shaft 4.

FIGS. 5(a) to 5(c) are illustrations for explaining the rotations of the front access panel 2 according to the first embodiment of the present invention. The position of the shelf 1 in FIG. 5(a) indicates a state withdrawn from the column 93 (FIG. 2) side, and the front access panel 2 appears. Moreover, when the worker pushes the shelf 1 shown in FIG. 5(a) toward the column 93 side, the front access panel 2 is rotated around the rotary shaft 4 (see FIG. 5(b)). Still moreover, at the mounting completion, the front access panel 2 appears on the front surface a side of the shelf 1 as shown in FIG. 5(c).

Thus, when the front access panel 2 having an L-like configuration in cross section is employed, in a state before the mounting of the shelf 1 in the rack 21, the front access pane 12 appears, so the worker can easily connect the interface cables 150 to the rear surface b of the shelf 1. Moreover, when the shelf 1 is pushed toward the rack side, the front access panel 2 is rotated by approximately 90° so that the front access panel 2 appears in the front surface a, which can contribute to the improvement of the beauty of the shelf 1.

Therefore, owing to the rotation of this front access panel 2, it is possible to considerably improve the visibility for the worker and further to shorten the operation time (work time) needed for the connection operation of the front access panel 2 and the interface cables 150. This can reduce the work burden, which enables securing a sufficient space for the operations to enhance the working efficiency.

In comparison between the present invention and the related art, in the case of the employment of the related art technique, a large number of racks 21 are placed on a floor in an optical transmission station (not shown) and shelves 1 are connected through cables to each other and the weight of the racks 21 mounting the shelves 1 increases. Accordingly, extreme difficulty was experienced in securing a work space for an worker. Concretely, this is because difficulty was experienced in carrying out the working procedures such as moving the racks 21, changing the installation directions of the racks 21 and further shifting the positions of the racks 21 for securing an extremely small space.

On the other hand, according to the present invention, it is possible to appropriately make connections of the interface cables 150 between desired devices such as the shelves 1 and panels such as the front access panel 2, and further to change the installation position of the front access panel 2.

In this way, it is possible to achieve the appropriate cable connections between the shelves 1 and the front access panel 2 and further to change the installation position of the front access panel 2.

(B) Description of Second Embodiment of the Present Invention

Furthermore, in a case in which the vertical width of the shelf 1 is long, referring to FIGS. 6 and 7, a description will be given of one example of each of an inserted state of a heat baffle having a cooling function, an installation procedure and a cooling method.

Figure 6:
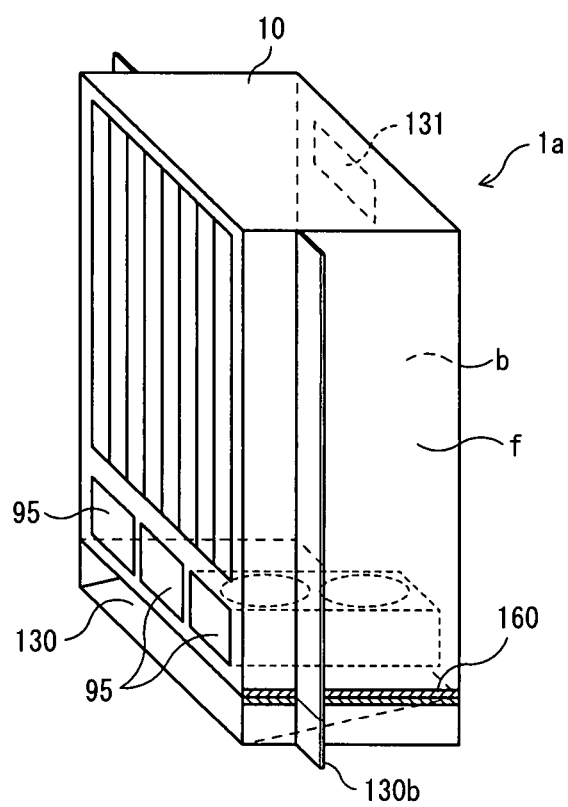
FIG. 6 is a perspective view showing a shelf of a rack mount apparatus equipped with a heat baffle according to a second embodiment of the present invention.

FIG. 6 is a perspective view showing a shelf with a heat baffle in a rack mount apparatus 20 according to a second embodiment of the present invention. The shelf 1a shown in FIG. 6 is equipped with a suction heat baffle 130, for example, under the opening portion 94 of the front surface a of the shelf 1 shown in FIG. 2 and, for example, three cooling fans 95 for cooling function are accommodated in the opening portion 94 (only one is shown in FIG. 6).

In this case, since the racks 21 are placed in a closed-up state in a small floor area in the interior of an optical transmission station and a plurality of shelves 1a are mounted in the rack 21 in a high-density state, there is a need to diffuse the heat produced from the substrate unit 91. For this reason, the shelf 1a is equipped with the aforesaid heat baffle 130 at a short distance and the cooling fans 95 are placed in the interior of the shelf main body 10 and further an air outlet 131 (indicated by a dotted line) is made in the rear surface b of the shelf main body 10.

The heat baffle 130 is a withdrawn member capable of taking a withdrawn position and an accommodated position relative to the rack 21 between the shelf 1a and the front access panel 2, and fixing members 130b placed on both side surfaces thereof are fixed through screws or the like to the columns 93 (not shown). Moreover, the front access panel 2 holds the opened position at the withdrawn position of the heat baffle 130, and in accordance with the pushing operation of the heat baffle 130 to the accommodated position, the front access panel 2 is rotated from the opened position to the closed position.

The respective functions of the withdrawing and pushing of the heat baffle 130 are realized with a withdrawing mechanism 160 composed of rail members provided both the heat baffle 130 and the shelf 1a and other members. This withdrawing mechanism 160 is formed on each of the right-side surface f of the shelf 1a and the left-side surface e thereof. As one example of this withdrawing mechanism 160, for example, as shown in FIG. 7, a withdrawing guide (rail or rotating body) 160b is provided under each of the rear sides of the right-side surface f of the shelf 1a and the left-side surface e (not shown) thereof, and a withdrawing slider 160a is formed on each of the rear sides of left-side surface of the heat baffle 130 and the right-side surface thereof. Moreover, the worker slides the sliders 160a of the heat baffle 130 on the guides 160b on the rear side of the shelf 1a.

Meanwhile, each of the cooling fans 95 shown in FIG. 6 is for generating cooling air for cooling the substrate units 91 in the interior of the shelf main body 10, the interface cables 150 and the front access panel 2.

When an end portion of the front access panel 2 comes into contact with the heat baffle 130 by the pushing operation of the heat baffle 130, the front access panel 2 is rotated from the opened position to the closed position.

Therefore, the front access panel 2 can mount units having various functions, such as the heat baffle 130, in the vicinity of the shelf 1, there by simplifying the work for the connections of the interface cables 150.

As the cooling method, it is possible to employ various methods, such as a method of applying cooling air to the shelf 1a from the external, and the cooling method is not limited to the structure shown in FIG. 6. Moreover, it is also possible to change the number of cooling fans 95 and the disposition method such as vertical disposition or horizontal disposition.

Figure 7:
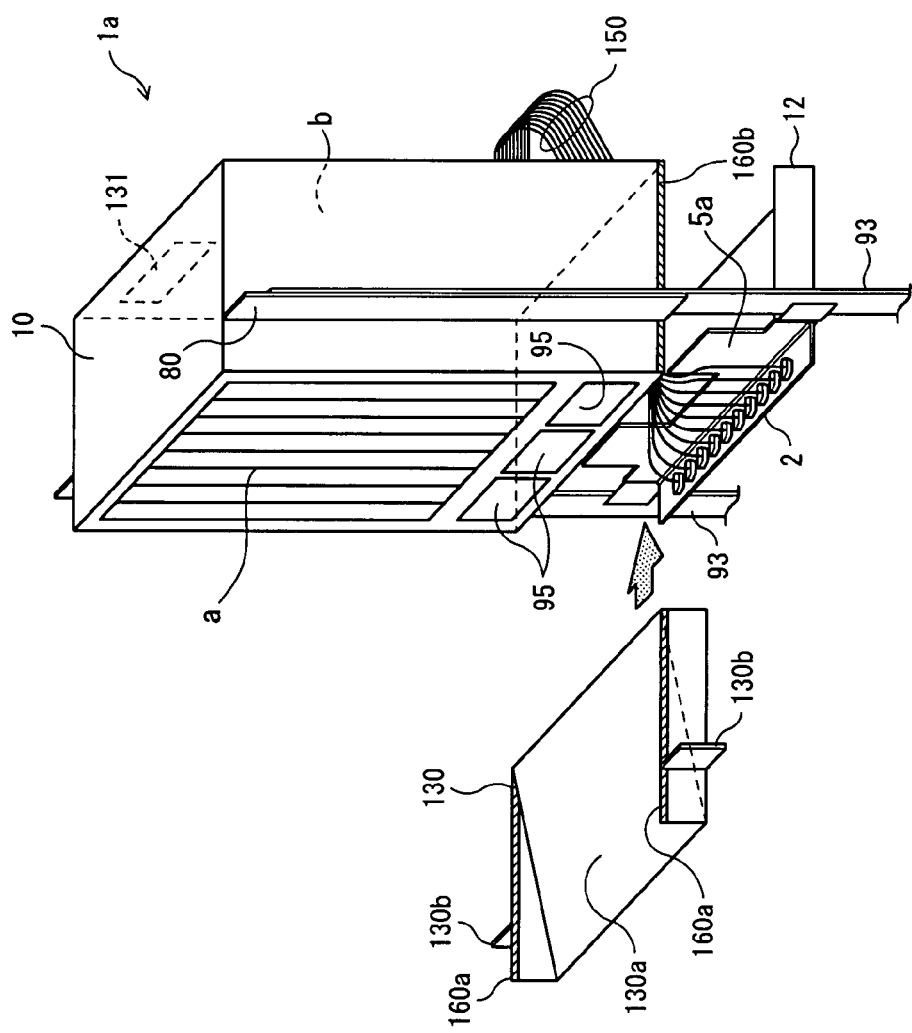
FIG. 7 is an illustration for explaining a shelf installation procedure of a rack mount apparatus according to the second embodiment of the present invention.

FIG. 7 is an illustration for explaining an installation procedure of the shelf 1a in the rack mount apparatus 20 according to the second embodiment of the present invention. In the installation procedure, the worker first mounts the shelf 1a and the front access panel 2 in the rack 21 and makes a connection through the interface cables 150 between the shelf 1a and the front access panel 2. Following this, the worker slides the heat baffle 130 from the front surface a between the shelf 1a and the front access panel 2 and inserts the heat baffle 130 therebetween while the heat baffle 130 pushes the flat surface 5a of the front access panel 2.

In addition, at the completion of mounting of the heat baffle 130, the front access panel 2 is rotated by approximately 90° so that the connector surface 5b appears on the front surface a side of the shelf 1a, and it functions as a front access panel. The illustration of the cooling fans 95 is omitted in FIG. 7.

Thus, an air vent passage in the heat baffle 130 goes up along an inclination of a bottom portion 130a so that a suction is made to a lower portion of the shelf 1a and, for example, in the three cooling fans 95, the air vent passage is bent to rise in the interior of the shelf 1a so that, after the substrate units 91 are cooled therein, the exhaust air is discharged from the air outlet 131 to the exterior.

Therefore, according to this installation procedure, combined with the heat baffle 130, it is possible to mount a unit having a function, other than the cooling function, whereby the worker can push the flat surface 5a of the front access panel 2 for insertion. Moreover, even in a case in which the vertical width of the shelf 1a increases due to the heat baffle 130, the high-density packaging function is maintainable. Still moreover, a high-flexibility front access panel 2 which allows the connections of the interface cables 150 can be packaged even if various types of shelves such as the heat baffle 130 are mounted at a short distance.

Thus, it is possible to employ a rack 21 having, for example, a narrow width of 19 inches and further to mount the front access panel 2 at a flexible position relative to the shelf 1a.

In addition, since the front access panel 2 appears under the front surface a of the shelf 1, 1a at the completion of mounting, the worker can more accurately connect each of the interface cables 150 to the connector 9 of the front access panel 2.

Furthermore, as well as the first embodiment, also in the second embodiment, the connections of the interface cables 150 can easily and reliably be made between the device such as the shelf 1a and the cross-section L-shaped front access panel 2 without imposing a stress on the interface cables 150.

Still moreover, since the shelf 1a equipped with the heat baffle 130 can carry out the almost same signal processing as the signal processing in the first embodiment, the front access panel 2 can be mounted on upper and lower surfaces of the shelf 1a, which can avoid an increase of the burden on the working efficiency.

Yet furthermore, a plurality of shelves 1a different in size from each other can also be mounted in one rack 21 in this way, which permits the relatively free selection of the mounting position.

(C) Description of Third Embodiment of the Present Invention

Each of the front access panels 2, 2a and 2b in the first and second embodiments is made to fall by the contact with the shelf main body 10 and rotate. In the third embodiment, the worker manually rotates the aforesaid front access panel 2, 2a, 2b so that the front access panel 2, 2a, 2b is accommodated in the rack 21. Each of the front access panels 2a and 2b is made to rotate as well as the front access panel 2, and the description will be given of the front access panel 2 for avoiding the double explanation.

Figure 8:
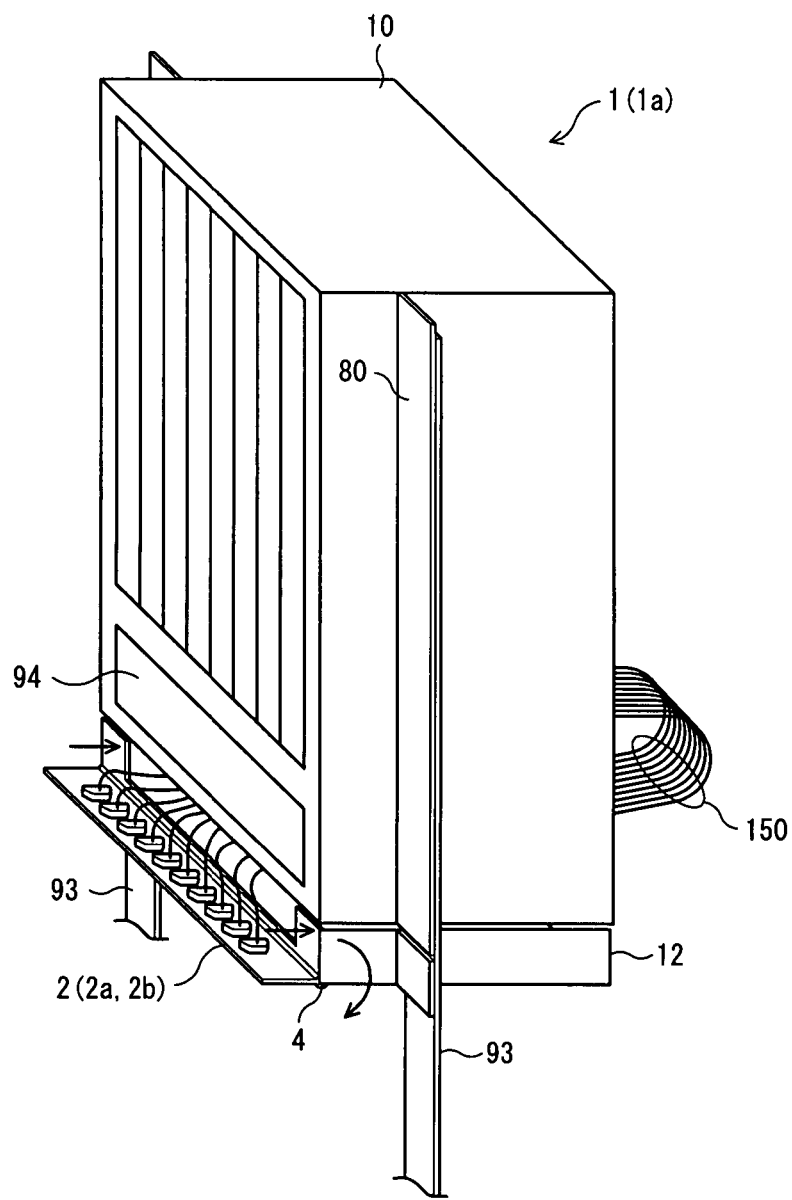
FIG. 8 is a perspective view for explaining a cable connection state in a cross-sectional L-shaped panel of a rack mount apparatus according to a third embodiment of the present invention.
Figure 9:
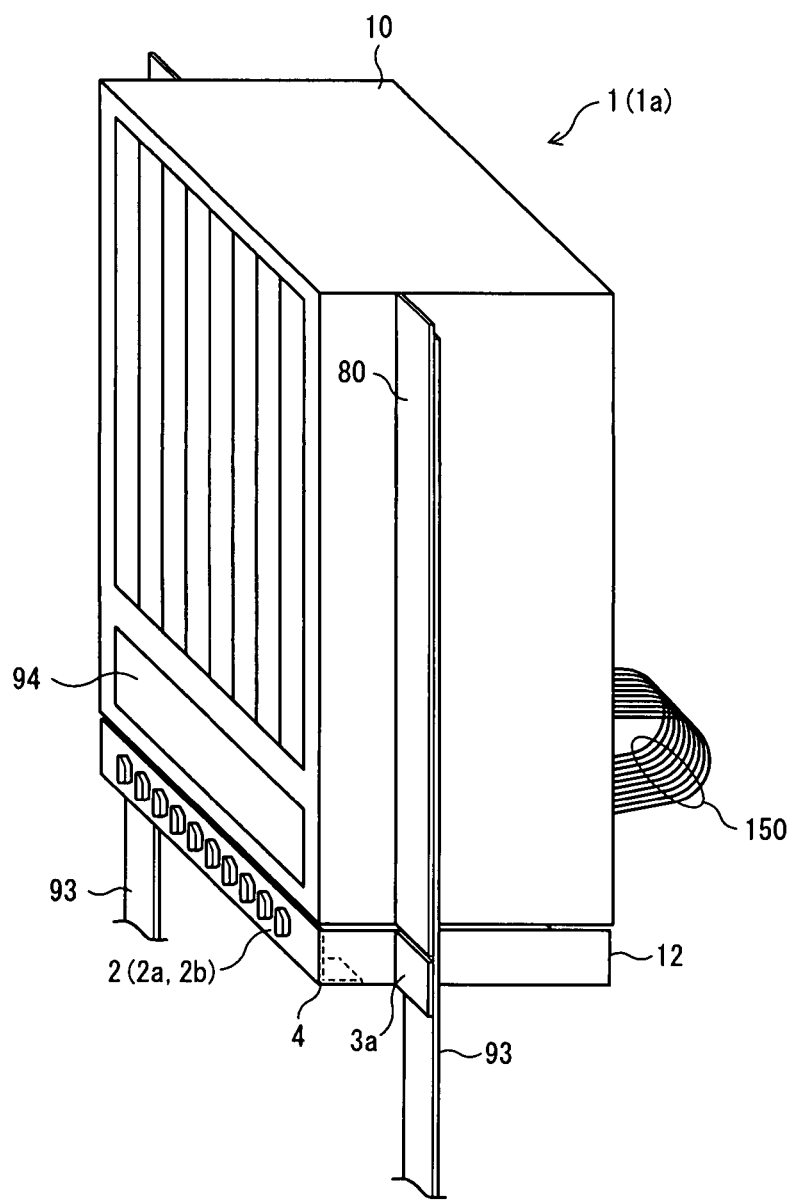
FIG. 9 is a perspective view for explaining an installation completion state of a cross-sectional L-shaped panel of a rack mount apparatus according to the third embodiment of the present invention.

FIG. 8 is a perspective view for explaining a cable connection state of the front access panel 2 in a rack mount apparatus 20 according to the third embodiment of the present invention, and FIG. 9 is a perspective view for explaining an installation completion state of the front access panel 2 in the rack mount apparatus 20 according to the third embodiment of the present invention. In FIGS. 8 and 9, the parts marked with the same reference numerals as those used above are the same as those mentioned above.

The front access panel 2 shown in FIG. 8 is fixed to the bearing plate 12 and both the ends of the rotary shaft 4 are rotatably inserted into, for example, holes made in the bearing plate 12. Moreover, the front access panel 2 is attached through the bearing plate 12 to the columns 93 so that the front access panel 2 is fixedly secured to the rack 21. Incidentally, it is also acceptable that the rotary shaft 4 is inserted into holes (not shown) made in flanges 3a fixed to the columns 93.

Thus, the worker withdraws the front access panel 2 from the rack 21 for the carrying out the cable connections and, when the connection operation reaches completion, manually rotates the front access panel 2. Since the connector surface 5b appears in front by this rotation, the front surface a of the shelf main body 10 shown in FIG. 9 has a good beauty, and the space-saving mounting in the rack 21 is realizable.

As described above, the front access panel 2 according to the third embodiment of the present invention can achieve the easy and reliable connections of the interface cables 150 without imposing a stress thereon. In addition, the front access panel 2 can be accommodated in the rack 21 having a small width, and the installation position thereof is flexibly selectable or changeable. Still additionally, the efficiency of the installation work of the interface cables 150 is considerably improvable.

A description will be given herein below of modifications of the front access panel 2.

Figure 10:
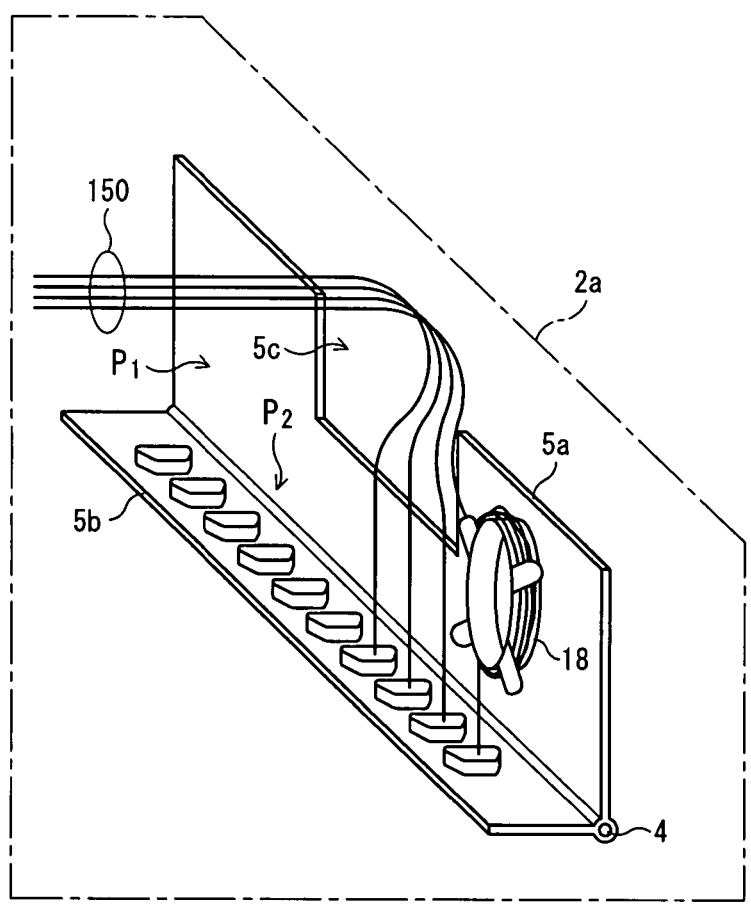
FIG. 10 is a perspective view showing a first modification of a cross-sectional L-shaped panel to be used in a rack mount apparatus according to the first to third embodiments of the present invention.

FIG. 10 is a perspective view showing a first modification of the front access panel 2 to be used in the rack mount apparatus 20 according to each of the first to third embodiments of the present invention. A front access panel 2a shown in FIG. 10 has a cable extra portion processing unit 18 for rolling an unnecessary or redundant cable of an optical cable 150 by its length thereon. As well known, the disconnection and re-connection of the optical cable 150 suffer an extremely large loss of transmission light. Therefore, the optical cable length has a margin in advance in consideration of a case of, for example, changes of disposition of the shelf 1, 1a, the rack 21 and others.

The radius of the cable extra portion processing unit 18 is set at a value larger than the allowable bend radius of the optical cables 150, and the cable extra portion processing unit 18 can be installed, for example, at a place indicated by $P_1$ or $P_2$. In a case in which it is possible to secure a space having a dimension larger than the allowable bend radius of the optical cable in the connector surface 5b, for example, by making a design so as to increase the area of the connector surface 5b or by decreasing the number of connectors 9 to be installed, the extra cable processing unit 18 can also be placed on the connector surface 5b.

In FIG. 10, the parts marked with the same reference numerals as those used above are same as those mentioned above.

Therefore, in a case in which the interface cables 150 connected to the rear surface b of the shelf 1, 1a have an extra portion, the worker can wind the interface cable 150 on the cable extra portion processing unit 18, thereby eliminating the need for conducting an operation to adjust a delicate length of the interface cable 150.

In a state before the mounting in the rack, the extra portion processing on the interface cables 150 can be conducted at the rear surface b side of the shelf 1. Therefore, the installation in an optical transmission state becomes feasible without carrying out special installation work or apparatus setting, which can realize high versatility.

In addition, the extra interface cables 150 does not go out into the exterior of the shelf 1, 1a, so the shelf 1, 1a has excellent beauty, and the space-saving mounting in the rack is realizable.

Figure 11:
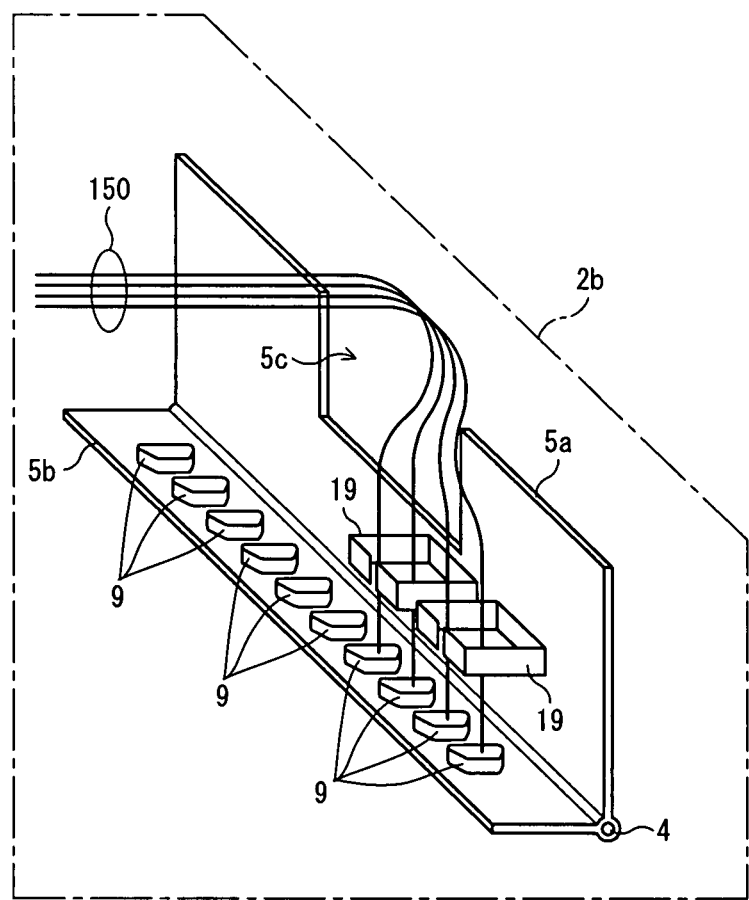
FIG. 11 is a perspective view showing a second modification of a cross-sectional L-shaped panel to be used in a rack mount apparatus according to the first to third embodiments of the present invention.
Figure 12B:
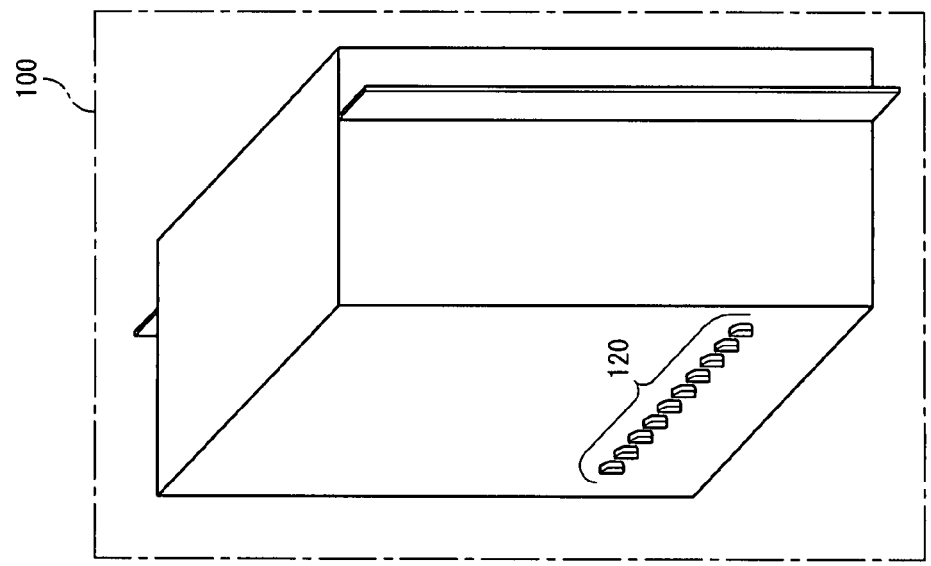
FIG. 12(b) is a perspective view of the common rack mount apparatus when viewed from a rear surface side.
Figure 12A:
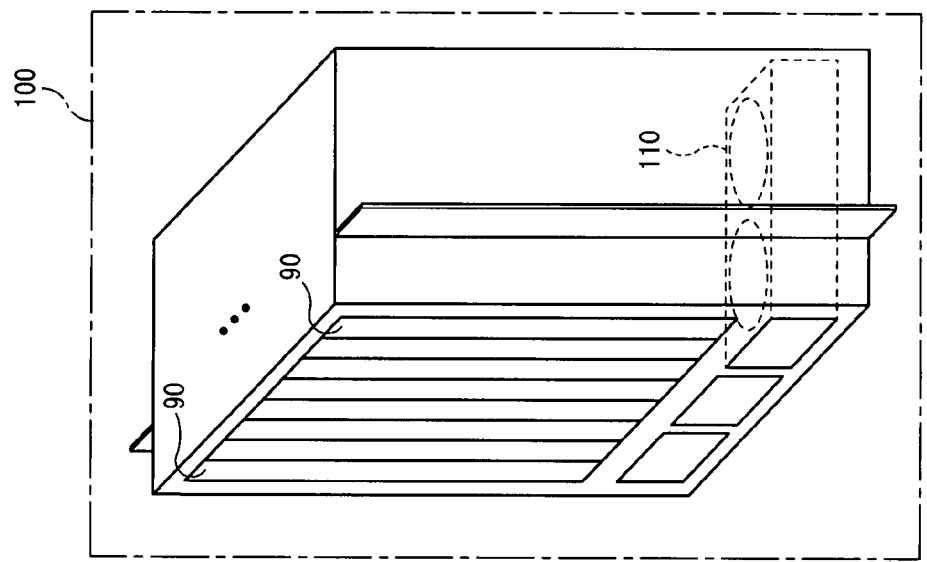
FIG. 12(a) is a perspective view of a common rack mount apparatus when viewed from a front surface side.
Figure 12A:
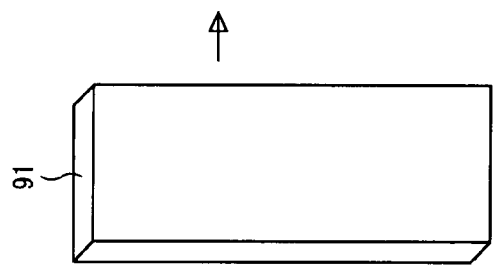
Figure 13:
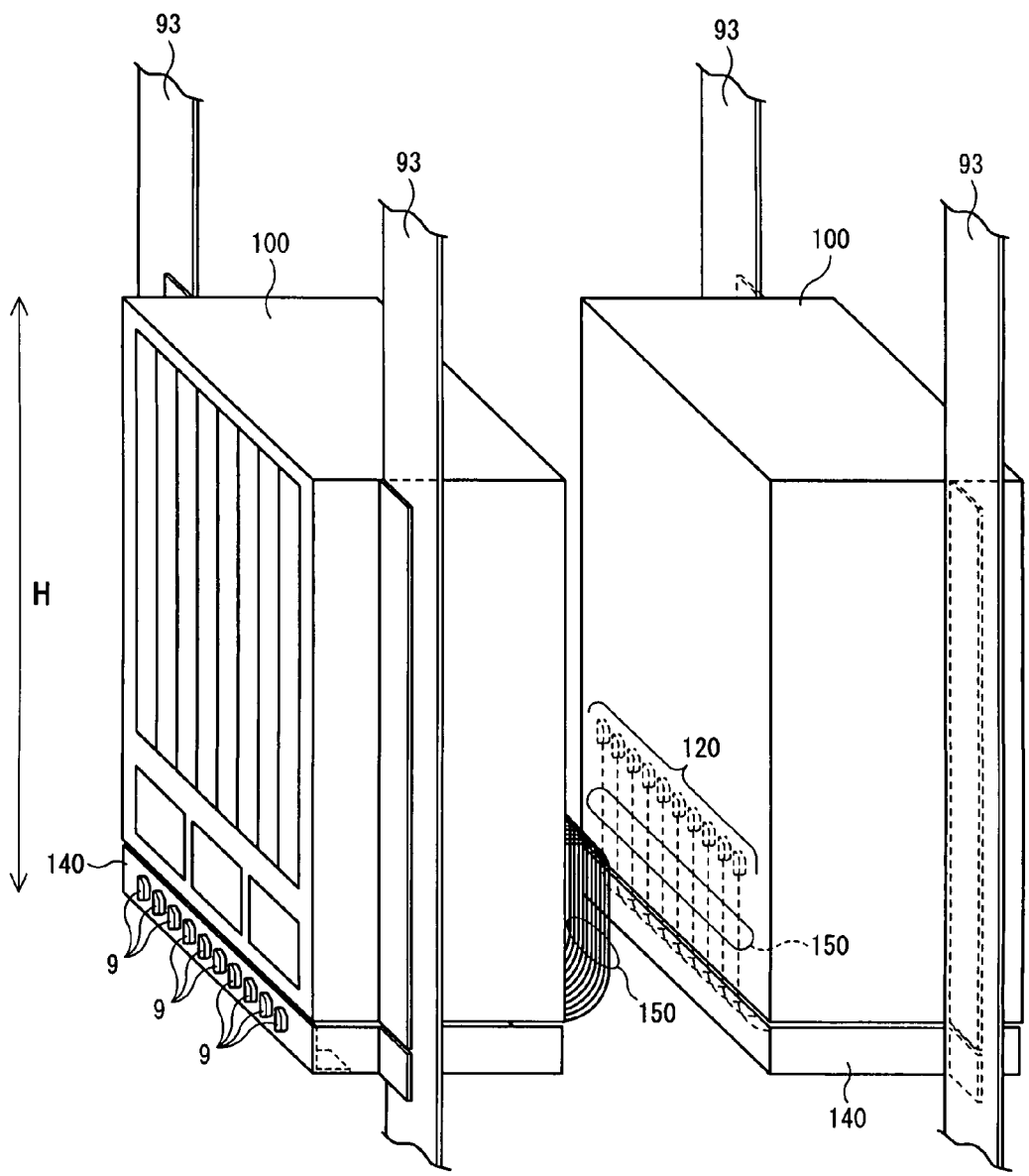
FIG. 13 is a partial perspective view showing a rack mount apparatus in the case of the Back-To-Back mounting.
Figure 14:
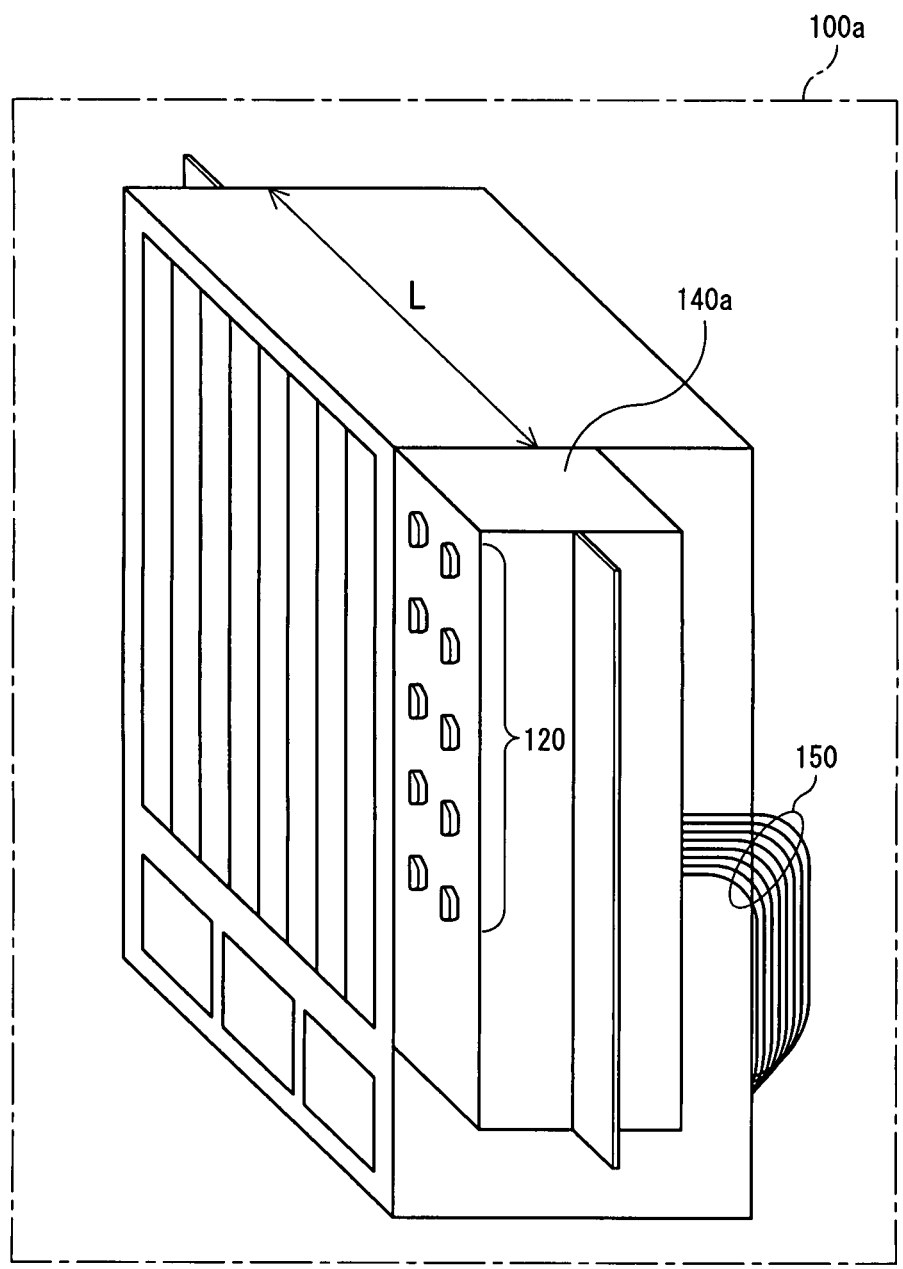
FIG. 14 is an illustration of one example of a shelf equipped with an access box on its side surface.

FIG. 11 is a perspective view showing a second modification of the front access panel 2 to be used in the rack mount apparatus 20 according to each of the first to third embodiments of the present invention. In a front access panel 2b shown in FIG. 11, a cable holder (cable holding unit) 19 is provided on the flat surface 5a for each wiring path of the interface cables 150. Each of the cable holders 19 is attached to the flat surface 5a. That is, of the above-mentioned flat surface 5a and connector surface 5b, the flat surface 5a is equipped with the cable holders 19 for separating a plurality of interface cables 150. In a case in which the connector surface 5b has a large area, or if the number of connectors 9 to be installed is small, each of the cable holders 19 can also be put on the connector surface 5b.

The shape of the cable holder 19 is, for example, a square configuration which enables easy mounting on the flat surface 5a. Moreover, the dimension of the cable holders 19, the number of interface cables 150 and others can selectively be set at various values.

In addition, it is also acceptable that both the end portions of the flat surface 5a shown in FIGS. 10 and 11 are removed so as not to come into contact with the sliders 11a and the guides 11b. In FIG. 11, the parts marked with the same reference numerals as those used above are same as those mentioned above.

Therefore, by concentrating, of the interface cables 150 connected to the rear surface b of the shelf 1, 1a, one or a plurality of interface cables 150, such as the power feed cables and the signal cables, different in application in the cable holders 19, the cable routes are separable. Moreover, in a state before the mounting in the rack, the worker can separate and arrange the respective interface cables 150 according to application.

Thus, a plurality of interface cables 150 is led to the front access panel 2b in this way, thereby avoiding the cable connections causing the degradation of the transmission characteristic stemming from the influence of electric noises and others.

Moreover, it is possible to employ the existing techniques such as the extra cable processing, the improvement of the transmission characteristic and others.

Still moreover, thus, with this front access panel structure, the interface cables 150 can easily and reliably be handled between the shelf 1, 1a and the front access panel 2, 2a, 2b. Yet moreover, the connections can be made without imposing a stress on the interface cables 150.

Since each of the shelves 1 and 1a is applicable to a rack 21 having a small width, it can be accommodated as an IP packet transferring apparatus in the rack 21, or a transferring apparatus and an optical transmission apparatus can be mounted therein in a state mixed. Moreover, the front access panels 2, 2a, 2b can be mounted at a flexible position relative to the shelves 1, 1a.

In addition to this, the installation of the front access panels 2, 2a, 2b and the connection operation efficiency of the interface cables 150 to be connected to the front access panels 2, 2a, 2b are considerably improvable.

(D) Others

The present invention is not limited to the above-described embodiments and modifications thereof, and it is also possible to changes the embodiments and modifications of the invention herein which do not constitute departures from the spirit and scope of the invention.

An apparatus equipped with this structured front access panel is applicable to, for example, an audio/visual apparatus. Concretely, a CD (Compact Disc) player, video deck, media player, speaker or the like corresponds to the substrate unit 91 of the aforesaid shelf 1. In addition, an audio/visual apparatus equipped with a CD player or the like, a rack 21 accommodating this audio/visual apparatus and structured front access panel are similar to the shelf 1 or the like in the first embodiment.

Furthermore, in place of the heat baffle 130 (FIGS. 6 and 7), for example, a storage unit or the like can also be inserted into the opening portion 94. The employment of this storage unit enables recording communication situations.

Still furthermore, with respect to the contact between the front access panel 2 and the shelves 1, 1a and the contact between the front access panel 2 and the heat baffle 130, a desired member can also be interposed therebetween.

As described in detail above, the structured interface cable connection panel in the rack mount apparatus according to the present invention can achieve the size reduction of the rack and is applicable to diverse rack mount apparatus having various types of functions, such as a communication apparatus, information processing apparatus and measurement device. In addition, it can be installed in an optical transmission station without carrying out special installation work and apparatus setting, which can realize high versatility.

Moreover, with the rack mount apparatus according to the present invention, the mounting in a rack having a small width is feasible, so the entire one rack including a plurality of rack mount apparatuses can operate, for example, each of an IP packet transferring apparatus and an optical transmission apparatus mounted in a state mixed. Therefore, the versatility of the apparatus is improvable.

What is claimed is:

1. A rack mount apparatus comprising:
    a rack in which a device is mountable in said rack by being moved along a movement direction into said rack, said device having a first surface, a second surface, and a first connection portion provided on the second surface, said first surface being opposite to a back-side of said rack when said device is positioned to be moved along the movement direction into said rack and is also opposite to the back-side of said rack when said device is mounted in said rack, said movement direction into said rack being a direction from the first surface of said device to the second surface of said device; and
    a cross-sectional L-shaped panel with a third surface having a second connection portion for an interface cable to be connected to said first connection portion while said device is mounted in the rack, said panel being installed in said rack and being under said device when said device is mounted in said rack and being rotatable so as to take at least
        an opened position in which the first surface is perpendicular to the third surface when said device is positioned to be moved along the movement direction into, and thereby be mounted in, said rack, and
        a closed position in which the third surface is substantially on a same plane with the first surface, after said device has been moved into said rack and is thereby mounted in said rack,
    wherein the movement of the device along the movement direction causes the panel to be rotated from the opened position to the closed position.

2. The rack mount apparatus according to claim 1, further comprising a slide mechanism which allows said device to slide to take at least a withdrawn position and an accommodated position,
    said panel taking the opened position at the withdrawn position of said device, and said panel being rotated from the opened position to the closed position in accordance with a sliding operation of said device to the accommodated position of said device by said slide mechanism.

3. The rack mount apparatus according to claim 1, wherein a withdrawn member which is made to take a withdrawn position and an accommodated position with respect to said rack is provided between said device and said panel, and
    said panel takes the opened position at the withdrawn position of said withdrawn member, and said panel is rotated from the opened position to the closed position in accordance with a pushing operation of said withdrawn member toward the accommodated position.

4. The rack mount apparatus according to claim 2, wherein, when an end portion of said panel is brought into contact with said device by the sliding operation of said device, said panel is rotated from the opened position to the closed position.

5. The rack mount apparatus according to claim 3, wherein, when an end portion of said panel is brought into contact with said withdrawn member by the pushing operation of said withdrawn member, said panel is rotated from the opened position to the closed position.

6. The rack mount apparatus according to claim 1, wherein said panel has a rotary shaft whose both ends are rotatably supported by said rack and two surface portions intersecting each other on the axis of said rotary shaft, and
    one surface portion of said two surface portions intersecting each other is brought into contact with said device, and the second connection portion is on the other surface portion of said two surface portions.

7. The rack mount apparatus according to claim 3, wherein said panel has a rotary shaft whose both ends are rotatably supported by said rack and two surface portions intersecting each other on the axis of said rotary shaft, and
    one surface portion of said two surface portions intersecting each other is brought into contact with said withdrawn member, and the second connection portion is on the other surface portion of said two surface portions.

8. The rack mount apparatus according to claim 6, wherein an extra portion processing unit for processing an extra portion of said interface cable is provided on said panel.

9. The rack mount apparatus according to claim 7, wherein an extra portion processing unit for processing an extra portion of said interface cable is provided on said panel.

10. The rack mount apparatus according to claim 6, wherein a cable holding section for separating a plurality of interface cables is provided on said panel.

11. The rack mount apparatus according to claim 7, wherein a cable holding section for separating a plurality of interface cables is provided on said panel.

12. The rack mount apparatus according to claim 1, wherein the second connection portion is substantially on a same plane with the first surface when the panel is in the closed position.

13. The rack mount apparatus according to claim 12, wherein the first surface is a front surface of the device.

14. An apparatus comprising:
    a rack in which a device is mountable by being moved along a movement direction into the rack, the device having a front surface and a back surface, the front surface being opposite to a back-side of the rack when the device is positioned to be moved along the movement direction into the rack and is also opposite to the back-side of the rack when the device is mounted in the rack, the movement direction being a direction from the front surface to the back surface, and a first connector is provided on the back surface; and a cross-sectional L-shaped panel with a panel surface having a second connector for an interface cable to be connected to the first connector while the device is mounted in the rack, the panel being installed in the rack and being under the device when the device is mounted in the rack, the panel being rotatable from an opened position in which the front surface of the device is perpendicular to the panel surface when the device is positioned to be moved along the movement direction into, and thereby be mounted in, the rack, to a closed position in which the panel surface is substantially on a same plane with the front surface of the device, after the device has been moved into the rack and is thereby mounted in the rack, so that the second connector appears on the front surface of the device, wherein the movement of the device along the movement direction causes the panel to be rotated from the opened position to the closed position.

* * * * *